US010620132B2

(12) United States Patent
Sitko et al.

(10) Patent No.: US 10,620,132 B2
(45) Date of Patent: Apr. 14, 2020

(54) SYSTEM AND METHOD FOR DETECTING A CONDITION OF A SEAL

(71) Applicant: Trelleborg Sealing Solutions US, Inc., Fort Wayne, IN (US)

(72) Inventors: Mark C. Sitko, Fort Wayne, IN (US); Larry J. Castleman, Monroeville, IN (US)

(73) Assignee: Trelleborg Sealing Solutions US, Inc., Fort Wayne, IN (US)

( * ) Notice: Subject to any disclaimer, the term of this patent is extended or adjusted under 35 U.S.C. 154(b) by 0 days.

(21) Appl. No.: 16/127,986

(22) Filed: Sep. 11, 2018

(65) Prior Publication Data

US 2019/0257763 A1   Aug. 22, 2019

Related U.S. Application Data

(60) Provisional application No. 62/633,868, filed on Feb. 22, 2018.

(51) Int. Cl.
*G01N 21/88* (2006.01)
*G01M 13/005* (2019.01)

(52) U.S. Cl.
CPC ...... *G01N 21/8851* (2013.01); *G01M 13/005* (2013.01); *G01N 2021/888* (2013.01)

(58) Field of Classification Search
CPC ................................................ G01N 21/8851
USPC ....................................................... 356/237.2
See application file for complete search history.

(56) References Cited

U.S. PATENT DOCUMENTS

| 4,521,807 | A | * | 6/1985 | Werson | B07C 5/10 348/134 |
| 4,731,649 | A | * | 3/1988 | Chang | G01N 21/9054 250/223 B |
| 4,945,228 | A | * | 7/1990 | Juvinall | G01N 21/9054 250/223 B |
| 5,489,987 | A | * | 2/1996 | Ringlien | G01N 21/9054 356/428 |
| 5,896,195 | A | * | 4/1999 | Juvinall | G01N 21/9054 356/240.1 |

(Continued)

FOREIGN PATENT DOCUMENTS

WO   2017/117566 A1   7/2017

OTHER PUBLICATIONS

Notification of Transmittal of the International Search Report and the Written Opinion of the International Searching Authority, or the Declaration dated Dec. 6, 2018 for International Application No. PCT/US2018/050421 (9 pages).

*Primary Examiner* — Tarifur R Chowdhury
*Assistant Examiner* — Omar H Nixon
(74) *Attorney, Agent, or Firm* — Taylor IP, P.C.

(57) ABSTRACT

A seal analysis system for measuring and analyzing a seal and a mating hardware configured to detect a defect and to analyze a condition of at least one of the seal and the mating hardware and includes a sensor and an electrical processing circuit. The sensor may be in a form of an optical inspection device, a laser scanner, a phone, or an ultrasound scanner. Additionally, the sensor may be provided to take a photo or video. The electrical processing circuit may be built in to the sensor or it may be a separate unit configured to communicate with the sensor. The electrical processing circuit may be configured to compare a condition of a seal and/or mating hardware against pre-set criteria.

18 Claims, 2 Drawing Sheets

(56) References Cited

U.S. PATENT DOCUMENTS

| | | | |
|---|---|---|---|
| 6,003,872 A | 12/1999 | Nord | |
| 6,172,748 B1* | 1/2001 | Sones | G01N 21/9054 356/237.1 |
| 6,256,095 B1* | 7/2001 | Ringlien | G01N 21/9054 356/239.4 |
| 6,543,886 B1* | 4/2003 | Hattori | B41J 2/17503 347/85 |
| 7,405,818 B2 | 7/2008 | Heinzen | |
| 7,477,374 B2 | 1/2009 | Schmidt et al. | |
| 8,166,891 B2 | 5/2012 | Borowski et al. | |
| 9,168,696 B2 | 10/2015 | Farrell | |
| 9,662,833 B2 | 5/2017 | Farrell et al. | |
| 2003/0202188 A1 | 10/2003 | Discenzso | |
| 2004/0060976 A1* | 4/2004 | Blazey | G06K 19/077 235/375 |
| 2004/0075218 A1 | 4/2004 | Heinzen | |
| 2005/0184160 A1* | 8/2005 | Steinmetz | G06K 7/10881 235/472.02 |
| 2007/0296963 A1* | 12/2007 | Parker | G01N 21/55 356/240.1 |
| 2008/0258401 A1* | 10/2008 | Cotton | B65D 55/028 277/321 |
| 2010/0141756 A1* | 6/2010 | Grote | B65C 9/067 348/127 |
| 2011/0013015 A1* | 1/2011 | Park | G01B 11/245 348/125 |
| 2012/0176655 A1* | 7/2012 | Shirakura | G03H 1/2205 359/32 |
| 2013/0008087 A1* | 1/2013 | Paavilainen | G09F 3/03 49/13 |
| 2013/0044007 A1* | 2/2013 | Paavilainen | G06F 3/0292 340/945 |
| 2014/0019303 A1* | 1/2014 | Argue | G06Q 30/06 705/26.64 |
| 2014/0222379 A1* | 8/2014 | Martinez Heras | G05B 23/024 702/188 |
| 2015/0241360 A1 | 8/2015 | Niemela et al. | |
| 2016/0055450 A1* | 2/2016 | Bedell | G06F 16/248 235/383 |

* cited by examiner

SYSTEM AND METHOD FOR DETECTING A CONDITION OF A SEAL

CROSS REFERENCE TO RELATED APPLICATIONS

This is a non-provisional application based upon U.S. provisional patent application Ser. No. 62/633,868 entitled "SYSTEM AND METHOD FOR DETECTING A CONDITION OF A SEAL", filed Feb. 22, 2018, which is incorporated herein by reference.

BACKGROUND OF THE INVENTION

1. Field of the Invention

The present invention relates to seal detection, in particular, to a system and method for determining relevant characteristics of a seal.

2. Description of the Related Art

Seal detection devices are used to determine when a seal should be repaired or replaced. U.S. Pat. No. 8,166,891 to Borowski et al. disclose concentric circular chevrons on a sealing surface to provide visual detection of proper installation. U.S. Pat. No. 7,477,374 to Schmidt et al. disclose a method and device for examining a sealing surface wherein an optical deflector is used to scatter light across a sealing surface. U.S. Pat. No. 7,405,818 to Heinzen discloses a self-monitoring static seal that utilizes an optical sensor and wear indicator on a sealing surface. U.S. Pat. No. 9,168,696 to Farrell and U.S. Pat. No. 9,662,833 to Farrell et al. disclose using lasers to change the optical properties of the seal surface.

SUMMARY OF THE INVENTION

In one exemplary embodiment formed in accordance with the present invention, a seal analysis system measures and analyzes a seal and/or mating hardware. The seal analysis system includes a seal analysis device, e.g. a sensor, and an electrical processing circuit, e.g. a digital processor, analog processor or any device configured to be used as an electrical processing circuit, configured for communication with the seal analysis device. The seal analysis system is further configured for detecting an undesirable characteristic, e.g. defect, information pertaining to useful life or a manufacturing recall, etc., and for analyzing a condition of the seal and/or the mating hardware. The seal analysis system can detect defects including a crack scratch, chip, depression and other flaws being located on the surface or internal to the seal and/or mating hardware. The seal analysis device may be portable or stationary and may be made up of devices including an optical inspection device, a laser scanner, a phone and an ultrasound scanner. The seal analysis device may be further provided to capture an image and/or a video. Communication between the seal analysis device and the electrical processing circuit may be wired or wireless. The electrical processing circuit may analyze and compare the information of a condition or defect supplied by the seal analysis device against pre-set criteria or against previously captured information of the seal and/or mating surface.

In another exemplary embodiment formed in accordance with the present invention, there is provided a seal analysis device, such as a sensor. The seal analysis device includes an electrical processing circuit and is configured for detecting an undesirable characteristic, e.g. defect, information pertaining to useful life or a manufacturing recall, etc., and for analyzing a condition of the seal and/or the mating hardware. The seal analysis device can detect defects including a crack scratch, chip, depression and other flaws being located on the surface or internal to the seal and/or mating hardware. The seal analysis device may be portable or stationary and may be made up of devices including an optical inspection device, a laser scanner, a phone and an ultrasound scanner. The seal analysis device may be further provided to capture an image and/or a video. The electrical processing circuit may analyze and compare the information of a condition or defect supplied by the seal analysis device against pre-set criteria or against previously captured information of the seal and/or mating surface.

In another exemplary embodiment formed in accordance with the present invention, there is provided a method for analyzing a seal and/or mating hardware. The method includes the steps of providing a seal and/or mating hardware, cleaning the mating hardware if needed, performing a visual inspection if needed, providing a seal analysis device, e.g. a sensor, configured for detecting an undesirable characteristic, e.g. defect, information pertaining to useful life or a manufacturing recall, etc., providing an electrical processing circuit, e.g. a digital processor, analog processor or any device configured to be used as an electrical processing circuit, configured to communicate with the seal analysis device, capturing at least one undesirable characteristic about the seal and/or mating surface, and communication the at least one undesirable characteristic to the electrical processing circuit. The at least one undesirable characteristic captured by the seal analysis device may include a defect or a condition. The electrical processing circuit may be configured to compare the at least one undesirable characteristic against a pre-set criteria point such as shape, color or sheen of a surface, or the depth or perimeter of the defect on a seal and/or mating surface.

An advantage of the present invention is an improved apparatus and method for determining acceptable seals and/or mating surfaces.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
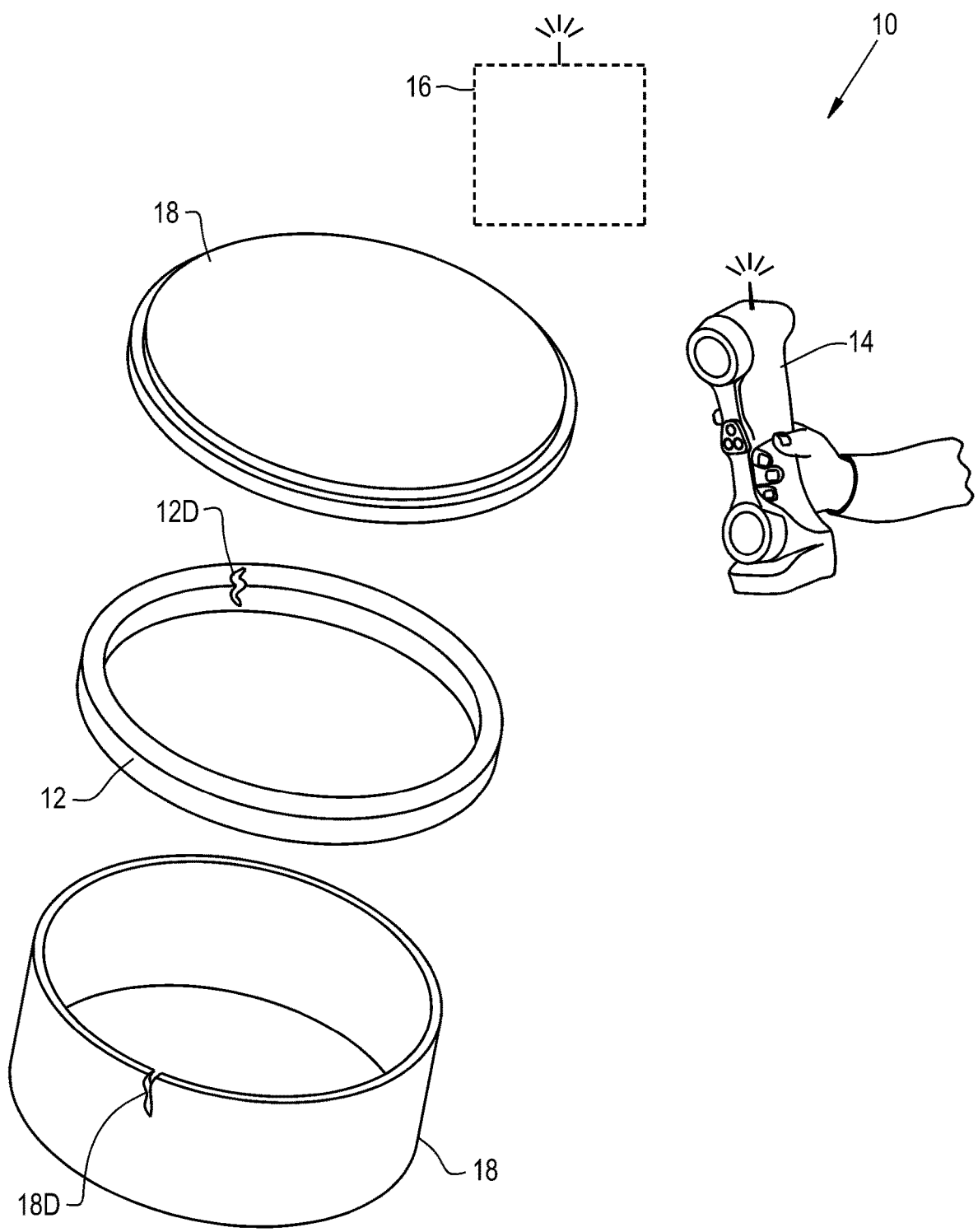
FIG. 1 shows an embodiment of a seal analysis system of the present invention.

Referring now to the drawings, and more particularly to FIG. 1, there is shown a seal analysis system 10 for measuring and analyzing a seal 12 and the mating hardware

18. The seal analysis system 10 generally includes a seal analysis device 14, e.g. sensor, and an electrical processing circuit 16, e.g. a digital processor, analog processor or any device configured to be used as an electrical processing circuit, which operably communicates with the seal analysis device 14. The seal analysis system 10 is configured for detecting an undesirable characteristic 12D in the seal 12 and/or the mating hardware 18, if one is present, and analyzing a condition of the seal 12 and/or the mating hardware 18.

The seal 12 may be in the form of any desired seal 12, which seals two or more mating surfaces. For example, the seal 12 may be in the form of a plate heat exchanger gasket, a manway seal for a railway car, gasket on various valve and engine assemblies, a seal in piping systems, annular seals, shaft seals, and a gasket for any other desired application. The seal 12 may be composed of any desired material such as a rubber material, plastic material, or other materials used in seals. The seal 12 may include identifying information such as a unique identifier in the form of an identifying label such as a part number, a mark, or a design including lettering, shapes, lines, colors, stripes, a QR code, a data matrix, a mark, an RFID tag, or any other desirable identifier. The unique identifier may be associated with information about the seal 12, which may be retrieved upon scanning the unique identifier. It should be appreciated that the identifier of the seal 12 may only be readable when the seal 12 is properly installed.

The undesirable characteristic 12D of the seal 12 and/or the mating hardware 18 may be in the form of any defect, such as a crack, a scratch, a chip, an expansion, a depression, and/or any other flaw in the seal 12 and may also include an identifying label. The defect may be on the surface of the seal 12, it may extend across the length, width, or depth of the seal 12, and/or the defect may be internally within the seal 12. As shown, the defect is on the surface of the seal 12 and extends into the depth of the seal 12.

The undesirable characteristic 18D of the mating hardware 18 may be in the form of any defect on the surface and/or within the body of the mating hardware 18. For example, the defect may be in the form of a crack, a scratch, a chip, an expansion, a depression, and/or any other flaw present on and/or within the mating hardware 18. The defect of the mating hardware 18 may extend across the length, width, or depth of the mating hardware 18 and/or the defect may be internally disposed within the mating hardware 18. The mating hardware 18 may be in the form of any hardware or portion thereof to which the seal mates onto or otherwise seals. For instance, the mating hardware 18 may be in the form of plate heat exchangers, manway covers on railway cars, valves, pipes in various piping systems, hardware for door covers, hardware for housing seals, and/or hardware for tubing connections.

The seal analysis device 14 may capture information of or identify the seal 12 by way of its unique identifier, the defect 12D of the seal 12, and/or mating hardware 18 to which the seal 12 mounts onto. The seal analysis device 14 may be in the form of any desired seal analysis device, such as an optical inspection device which may take a photo and/or video of the seal 12, a laser scanner, and/or an ultrasound scanner. The seal analysis device 14 may be a portable and/or a stationary device. For instance, the seal analysis device 14 may be in the form of a portable three-dimensional (3D) laser scanner 14 that may scan the entire seal 12 or portions thereof, and which may be operated on-site by an operator. Thereby, the portable 3D scanner 14 may capture a 3D image of the seal 12 and/or the defect 12D of the seal 12, and/or a 3D image of the mating hardware 18 and/or the defect 18D of the mating hardware 18. For instance, the 3D data captured by the seal analysis device 14 may be used to create a 3D model of the seal 12 and/or the defect 12D of the seal 12. It should be appreciated that the seal analysis device 14 may also be in the form of a phone equipped with an image or video capturing device in order to capture data about the seal 12 and/or mating hardware 18.

The electrical processing circuit 16 may be operably coupled to the seal analysis device 14. For example, the electrical processing circuit 16 may operably communicate with the seal analysis device 14 via a wired or wireless connection. In the present embodiment shown, the seal analysis device 14 wirelessly communicates with the electrical processing circuit 16. The electrical processing circuit 16 may be in the form of a central processing unit (CPU) or control unit that includes software to review the data received from the seal analysis device 14. For instance, the electrical processing circuit 16 may include the necessary software to process the images or videos captured by the seal analysis device 14 by comparing these images or videos to pre-set criteria in order to detect an acceptable or unacceptable condition of the seal 12. The pre-set criteria may include tolerance levels regarding the shape of the seal 12, the color or sheen of the seal 12, the depth of the defect 12D, or the perimeter of the defect 12D on the surface of the seal 12. It is possible for the electrical processing circuit 16 to include various pre-set acceptable or unacceptable conditions of a particular type of seal 12 and/or mating hardware 18. It is also possible for the electrical processing circuit 16 to include prior or pre-set information about the seal 12, such as the type of seal 12, the seal model number, the manufacturing date, date of installation of the seal 12, the material(s) of the seal 12, the previous and/or next service interval(s), a photograph, video, or service report of the previous inspection or analysis of the seal 12 and/or mating hardware 18, the date of replacement of the seal 12, and any other desired information. The electrical processing circuit 16 may be located at an off-site, e.g. remote, location. In this regard, the information captured by the seal analysis device 14 may be uploaded to a remote database, and the information may be subsequently checked by an offsite software program via the electrical processing circuit 16 and/or by an offsite individual.

Figure 2:
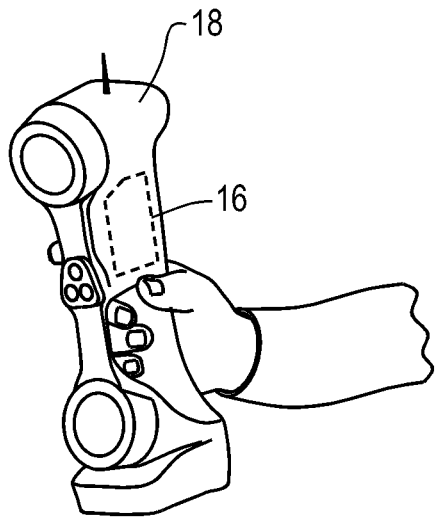
FIG. 2 shows a perspective view of another embodiment of a seal analysis device.

Referring now to FIG. 2, there is shown another embodiment of a seal analysis device 18. The seal analysis device 18 is substantially the same as the seal analysis device 14, except that the seal analysis device 18 includes the electrical processing circuit 16 such that the electrical processing circuit 16 is internally disposed within the seal analysis device 18. Thereby, analysis of the seal 12 can be conducted without the need to communicate information to an off-site location.

Figure 3:
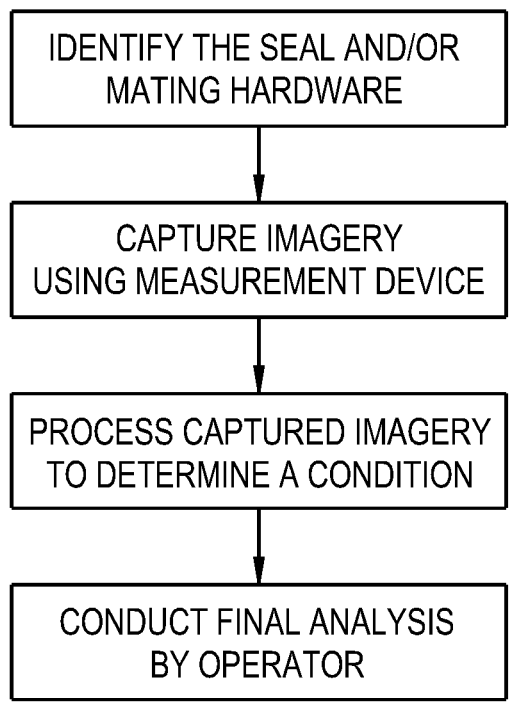
FIG. 3 shows an embodiment of a flowchart of a method for analyzing a seal and a mating hardware.

Referring now to FIG. 3, there is shown a method to analyze a seal 12 and/or mating hardware 18 according to the present invention. For brevity of description, the method is discussed in regard to the seal analysis device 14; however, both seal analysis devices 14, 18 may be used to conduct the method of the present invention. In operation, an on-site operator, such as a technician, may begin the method by removing old parts and cleaning up the hardware surrounding the seal 12 so that an acceptable visual image may be captured, if necessary. The on-site operator may also conduct a visual inspection of the seal 12, the mating hardware 18, or any other pertinent equipment in order to ensure a good working order and that the seal 12 is calibrated correctly. For example, the visual check of the seal 12 and/or mating hardware 18 may include visually checking the sealed element 12, visually checking the contact surface(s) of the sealed element 12 or mating hardware 18, and/or visually checking the non-contact surface(s) and non-sealing surface(s) to which the seal 12 is not attached or sealed. After conducting any preliminary step(s), an off-site or on-site operator may then conduct a step of identifying the seal 12 and/or the mating hardware 18. The step of identifying the seal 12 may include inputting any desired information about the seal 12, e.g. the part number, lot number, application of the seal 12, etc., directly into the seal analysis device 14 and/or into the electrical processing circuit 16. Effectively, this sub-step may be completed to manually input the appropriate background information into the software of the electrical processing circuit 16 so that the software knows which seal 12 and/or mating hardware 18 is at hand and/or identify the application of the seal 12 in order to subsequently begin the analysis of the seal 12 and/or the mating hardware 18. Additionally, or alternatively, the step of identifying the seal 12 and/or mating hardware 18 may include using the seal analysis device 14, by an on-site operator, to capture information about the seal 12 and the mating hardware 18. For example, the seal analysis device 14 can capture imagery in the form of a photo or video of the seal 12 or scan the identifier of the seal 12 and/or the mating hardware 18 in order to automatically inform the electrical processing circuit 16 as to the particular seal 12 and/or mating hardware 18 which will be analyzed. After identifying the seal 12 and/or the mating hardware 18, or concurrently therewith, an on-site operator may use the seal analysis device 14 to gather information, such as imagery in the form of a photo or video, of the seal 12, the seal defect 12D of the seal 12, and/or the mating hardware 18. The seal analysis device 14 may then communicate this captured imagery to the electrical processing circuit 16. Then, the electrical processing circuit 16 may process the information based upon the pre-determined criteria discussed above in order to determine a condition of the seal 12 and/or mating hardware 18. In the embodiment where the seal analysis device 14 is used to capture a 3D model of the seal 12 and/or the mating surface(s) of the mating hardware 18, the electrical processing circuit 16 and/or an off-site individual may analyze the general shape of the seal 12, the sealed surface(s) of the seal 12, the gap(s) or lack thereof between the mating surface(s) of the seal 12 and the mating hardware 18. Further, an off-site individual may then conduct a final analysis of whether the seal 12 and/or the mating hardware 18 is acceptable or unacceptable by reviewing the analysis conducted by the electrical processing circuit 16 to confirm its conclusion. It should be appreciated that the off-site individual may also review the information gathered by the seal analysis device 14. The method may also include a step of repeating the above process steps for each component of the seal 12, the mating hardware 18, and/or for multiple seal 12 and mating hardware 18 combinations in an assembly. The method may further include a step of taking a photo or video during and/or after the installation of the seal 12 and/or mating hardware 18 to confirm that the installation and the operating process is correct. A photo or video may also be taken of the installed seal 12 and/or the mating hardware 18, and then this information may be analyzed by the electrical processing circuit 16 against known criteria in order to confirm that the installation of the seal 12 is correct.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A seal analysis system, comprising:
    a seal analysis device having a scanning sensor configured for measuring and analyzing at least one of a seal and a mating hardware, a surface of the seal being in contact with a surface of the mating hardware, the seal being movable relative to the mating hardware, the scanning sensor being configured to capture at least one of a photo or a video of the seal; and
    an electrical processing circuit configured to operably communicate with the sensor, the sensor and the electrical processing circuit being configured to detect and analyze at least one undesirable characteristic of at least one of the seal or the mating hardware.

2. The seal analysis system of claim 1, wherein the undesirable characteristic includes at least one of a crack, a scratch, a chip, an expansion, a depression, and a flaw.

3. The seal analysis system of claim 1, wherein the undesirable characteristic includes at least one of a bar code, a QR code, and a mark.

4. The seal analysis system of claim 1, wherein the undesirable characteristic is located at least one of on a surface and at an internal location.

5. The seal analysis system of claim 1, wherein the seal analysis device is at least one of an optical inspection device, a laser scanner, a phone, and an ultrasound scanner.

6. The seal analysis system of claim 1, wherein the seal analysis device is a portable device or a stationary device.

7. The seal analysis system of claim 6, wherein the portable device is a three-dimensional laser scanner.

8. The seal analysis system of claim 1, wherein the electrical processing circuit operably communicates with the seal analysis device via a wired connection or a wireless connection.

9. The seal analysis system of claim 1, wherein the electrical processing circuit is configured to compare an undesirable characteristic against a pre-set criteria.

10. The seal analysis system of claim 9, wherein the pre-set criteria includes tolerance levels regarding a shape, a color or a sheen of a surface, a depth of a defect, or a perimeter of the defect of at least one of the seal and the mounting hardware.

11. The seal analysis system of claim 9, wherein the electrical processing circuit is integral to the seal analysis device.

12. A seal analysis device, comprising:
    a scanning sensor configured for measuring and analyzing a seal and a mating hardware, a surface of the seal being in movable contact with a surface of the mating hardware, the scanning sensor being configured to capture at least one of a photo or a video of the seal; and
    an electrical processing circuit configured to operably communicate with the scanning sensor, the scanning sensor and the electrical processing circuit in a configuration to detect a undesirable characteristic and to analyze a condition of at least one of the seal or the mating hardware.

13. A method for analyzing a seal and a mating hardware, comprising:
    providing the seal and the mating hardware, a surface of the seal being mated to a surface of the mating hardware;

performing a visual inspection of the seal and the mating hardware;

providing a seal analysis device configured for capturing information;

providing an electrical processing circuit configured to communicate with the seal analysis device;

capturing at least one of a photo or a video of the seal;

capturing at least one undesirable characteristic about at least one of the seal or the mating hardware with the seal analysis device; and communicating the at least one undesirable characteristic about the at least one of the seal and the mating hardware from the seal analysis device to the electrical processing circuit.

14. The method of claim 13, wherein the at least undesirable characteristic is at least one of a defect and a condition.

15. The method of claim 13, wherein the electrical processing circuit is configured to determine a condition by comparing the at least undesirable characteristic against at least one pre-set criteria point.

16. The method of claim 15, wherein the pre-set criteria includes tolerance levels regarding a shape, a color or a sheen of a surface, a depth of the defect, or a perimeter of the defect of at least one of the seal and the mounting hardware.

17. The method of claim 13, wherein the sensor is configured to capture a three-dimensional model of the seal.

18. The method of claim 13, provided further with the step of an offsite individual conducting an analysis of the seal.

* * * * *